United States Patent [19]

Maruyama

[11] 4,370,898

[45] Feb. 1, 1983

[54] ADJUSTABLE FASTENING DEVICE

[75] Inventor: Katsuaki Maruyama, Toyota, Japan

[73] Assignee: Toyoto Jidosha Kogyo Kabushiki Kaisha, Aichi, Japan

[21] Appl. No.: 179,751

[22] Filed: Aug. 20, 1980

[30] Foreign Application Priority Data

Aug. 27, 1979 [JP] Japan .................. 54-118324[U]

[51] Int. Cl.³ .................. G05G 5/24; A47C 7/38
[52] U.S. Cl. .................. 74/540; 297/408; 403/93
[58] Field of Search .................. 74/540; 297/356, 408; 403/93

[56] References Cited

U.S. PATENT DOCUMENTS

| | | | |
|---|---|---|---|
| 773,720 | 11/1904 | Drury | 297/408 X |
| 970,635 | 9/1910 | Matthes | 297/356 X |
| 2,812,802 | 11/1957 | Gielow . | |
| 2,828,810 | 4/1958 | Barecki et al. | 297/408 X |
| 3,186,253 | 6/1965 | Ramillon | 74/540 |

FOREIGN PATENT DOCUMENTS 236066 10/1964 Australia .................. 403/93
1033382 11/1955 Fed. Rep. of Germany .

Primary Examiner—Allan D. Herrmann
Attorney, Agent, or Firm—Birch, Stewart, Kolasch & Birch

[57] ABSTRACT

A device for fastening a first member such as a head rest relative to a second member such as a head rest supporting member in an inclining adjustable manner, including a one-way ratchet and pawl mechanism incorporated between the two relatively rotatable members, wherein the pawl is driven out of engagement with the ratchets when the two relatively rotatable members have been brought to an extreme relative position allowed by one-way sliding engagement of the ratchets and the pawl, and a control member which catches and holds the driven up pawl at the extreme relative rotational position and releases the pawl when the two relatively rotational members have been brought to the other extreme relative rotational position so as to make the pawl again engage the ratchets at the second mentioned relative rotational position.

6 Claims, 3 Drawing Figures

ADJUSTABLE FASTENING DEVICE

BACKGROUND OF THE INVENTION

The present invention relates to a device for adjustably fastening two relatively rotatable members to each other between two relative rotational positions.

A device such as mentioned above is required in various structures, paticularly in those which are related with seats for human being. For example, the head rest mounted at the top of the seat back of a seat in an automobile is generally supported from a supporting frame by way of an adjustable fastening device which allows for adjustment of inclination of the head rest in accordance with the physical features and taste of the driver or passenger who is seated in front of it.

Conventionally, the devices for adjustably fastening two relatively rotatable members to each other between two relative rotational positions, like the device for fastening the head rest to its supporting frame so that its inclination can be optionally adjusted, have generally incorporated a screw means, which is adapted to be loosened and tightened by a general or exclusive tool, or which is adapted to be manipulated by the hand of the driver or passenger. In these cases, however, the inclination adjusting operation was not very easy, paticularly for women or children, and it sometimes strained and/or hurt the hands of the operator. Further, when the fastening was dependent upon frictional engagement of two relatively movable elements, the fastening operation was not sufficient, the head rest readily yielded to the impact force applied thereto in an accident and did not effectively support the head of the driver or passenger.

SUMMARY OF THE INVENTION

It is therefore the object of the present invention to provide an improved adjustable fastening device which allows a person readily to adjust the relative rotational position of two relatively rotatable members between two limited relative rotational positions and which, when an adjusted relative rotational position of the two members has once been obtained, automatically maintains the adjusted position against any large force applied to one of the two members in a particular direction, as in the case of the head rest in an automobile.

According to the present invention, the abovementioned object is accomplished by a device for adjustably fastening first and second relatively rotatable members to each other between first and second relative rotational positions, comprising a ratchet member fixed to said first member and having a plurality of ratchets arranged along an arc having its center at the pivoting axis of said first and second members, a pawl member movably supported by said second member and engaging said ratchets so as to allow said first member to rotate relative to said second member in a first direction toward said first relative rotational position while preventing said first member from rotating relative to said second member in a second direction opposite to said first direction toward said second relative rotational position, a pawl disengaging means which removes said pawl member from engagement with said ratchets when said first and second members have been brought to said first relative rotational position, a control member which engages said pawl member so as to hold said pawl member as disengaged from said ratchets until said first and second members are brought to said second relative rotational position, and a control releasing means which releases said control member from said pawl member when said first and second members have been brought to said second relative rotational position so that said pawl member again engages said ratchets.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
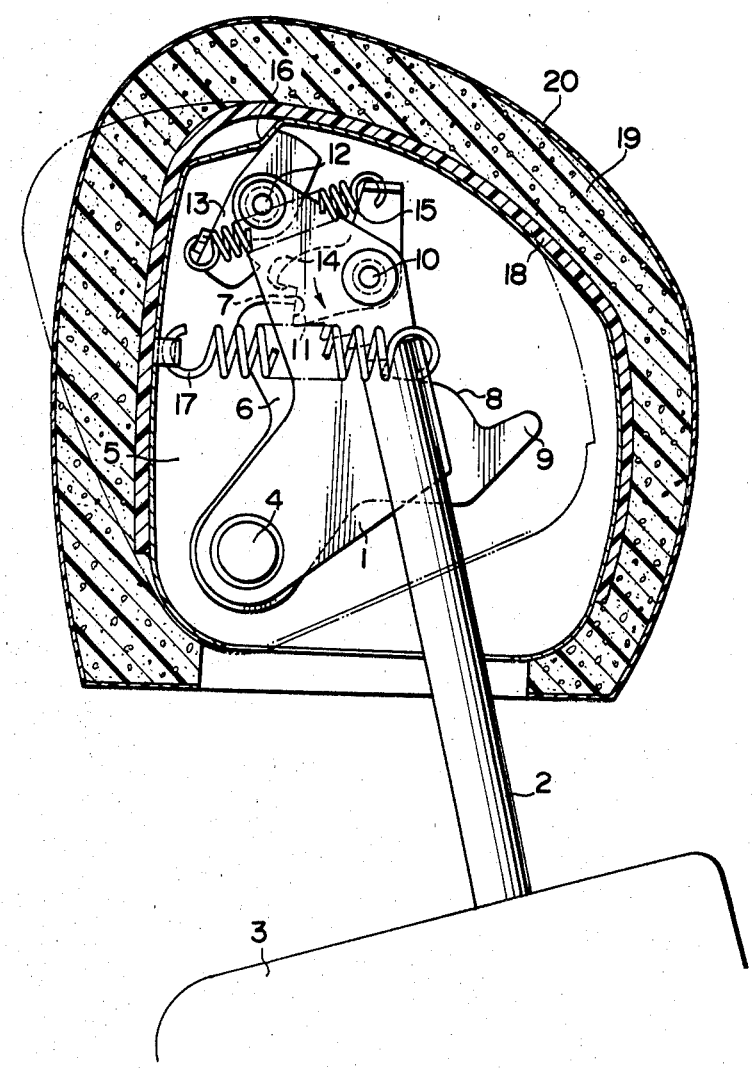
FIG. 1 is a vertical sectional view of a head rest in an automobile, showing an embodiment of the adjustable fastening device according to the present invention incorporated in the head rest for supporting it from a stay member in a manner such that the inclination of the head rest can be adjusted.
Figure 2:
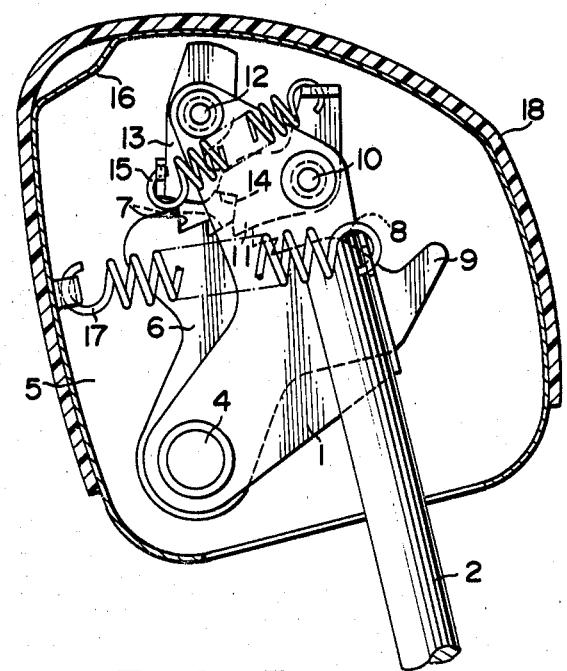
FIGS. 2 and 3 are views similar to FIG. 1, showing two different operating conditions of the device shown in FIG. 1, with a part thereof being omitted for the purpose of simplicity.
Figure 3:
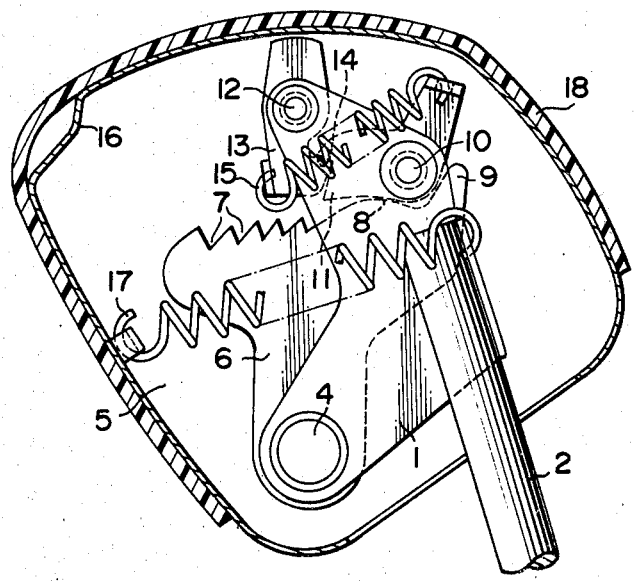

Referring to FIGS. 1-3, a support member 1 is firmly mounted at the upper end of a stay 2 which is inserted into a corresponding bore (not shown in the figure) formed in a seat back 3 in an automobile. The support member 1 supports a frame member 5 by way of a pivot shaft 4 so that the frame member 5 is rotatable around the central axis of the pivot shaft 4 relative to the support member 1 and the related support structures including the stay 2 and the seat back 3. The frame member 5 is a plate in the shown embodiment, and forms a part of the body of a head rest having a cross sectional contour as shown in FIG. 1.

On the frame member 5 there is firmly mounted a ratchet member 6 having a plurality of ratchets 7 arranged along an arc having its center at the central axis of the pivot shaft 4, i.e. the pivoting axis of the frame member 5 relative to the support member 1. The ratchet member 6 also includes a land portion 8 and a stop portion 9.

The support member 1 further rotatably supports a pawl member 11 by way of a pivot pin 10, the pawl member having a pawl edge adapted to engage each one of the ratchets 7 in such a one-way manner that the ratchet member 6 can rotate anticlockwise as viewed in FIG. 1 with its ratchets 7 being automatically disengaged from the pawl edge while clockwise rotation of the ratchet member 6 as viewed in FIG. 1 is prevented by the pawl edge being engaged into one of the ratchets 7.

The support member 1 still further pivotably supports a control member 13 by way of a pivot pin 12. The control member 13 has a hooked edge portion which selectively engages an edge portion 14 of the pawl member 11, as described hereinunder. The control member 13 is biased to turn anticlockwise as viewed in FIG. 1 by an expansion coil spring 15 extended between a lower end portion of the control member 13 and an upper end portion of the pawl member 11, the pawl member 11 being thereby biased also to rotate anticlockwise as viewed in FIG. 1, so that the pawl edge is elastically biased toward engagement with ratchets 7. When the control member 13 is positioned as shown in FIG. 1 due to relative rotational position between the support member 1 and the frame member 5, the upper end of the control member 13 abuts against a stop wall portion 16 formed in the body of the head rest.

An expansion coil spring 17 is extended between the body of the head rest and the support member 1 so as to bias the body of the head rest to turn around the pivot shaft 4 clockwise as viewed in FIG. 1, such a biasing moment being opposed by the aforementioned non return engagement between one of the ratchets 7 and the pawl edge of the pawl member 11.

Around the body of the head rest there is mounted a base cover 18 made of a plastic material, and further around the body and the base cover there is mounted a pad 19 made of a foamed synthetic resin and wrapped up by a skin layer 20.

As viewed in FIG. 1, the lefthand side of the head rest is the front side which faces forward in an automobile and which contacts the head of the driver or passenger.

In the condition shown in FIG. 1, the head rest is inclined mostly backward, i.e. rotated mostly clockwise as viewed in FIG. 1 around the pivot shaft 4 relative to the support member 1. In this condition, as mentioned above, the upper end of the control member 13 is in engagement with the stop wall portion 16 of the body of the head rest and is thereby rotated clockwise as viewed in FIG. 1 around the pivot pin 12 so that its hooked edge portion is pulled apart from the edge portion 14 of the pawl member 11. The pawl member 11 is biased by the expansion coil spring 15 to rotate anticlockwise as viewed in FIG. 1 around the pivot pin 10, and its pawl edge is engaged with the most forward ratchet to which the reference numeral 7 is attached. Due to the one-way engagement between the ratchets and the pawl as described above, any further backward inclination of the head rest is definitely prevented, while the head rest is stably maintained in this position by the expansion coil spring 17 working between the body of the head rest and the support member 1.

The inclination of the head rest can be optionally changed so that it is inclined forward from the position shown in FIG. 1, if it is directly so driven by the hand of the driver or passenger, against the spring force of the expansion coil spring 17. When the head rest is driven forward or leftward in FIG. 1 so as to rotate around the pivot shaft 4, the pawl edge of the pawl member 11 slides over the ratchets 7, thereby allowing the frame member 5 to rotate anticlockwise as viewed in FIG. 1 around the pivot shaft relative to the support member 1. When such a driving force applied by hand is removed after a proper forward inclination has been obtained, the pawl edge of the pawl member 11 engages an intermediate one of the ratchets 7, and a new relative rotational position between the support member 1 and the frame member 5, such as shown in FIG. 2, is now established. Also in this condition, any backward inclination of the head rest from the position shown in FIG. 2 is positively prevented by the engagement between the pawl edge of the pawl member 11 and the one of the ratchets 7, which is in engagement with the pawl, while forward tumbling of the head rest is firmly prevented by the expansion coil spring 17. In FIG. 2, it is to be noted that the upper end of the control member 13 is now released from the engagement with the stop wall portion 16, and the side wall portion of the hooked edge portion of the control member 13 is in sliding contact with the side wall portion of the edge 14 of the pawl member 11.

When the head rest is again to be inclined backward from the condition shown in FIG. 2, the head rest is first inclined forward such that the pawl member 11 is rotated further clockwise by riding on the land portion 8 of the ratchet member 6 and that finally the forward inclination of the head rest is prevented by the pivoted root portion of the pawl member 11 engaging the stop portion 9 of the ratchet member 6. This final condition is shown in FIG. 3. As seen in FIG. 3, when the pawl member 11 is rotated far clockwise by riding on the land portion 8 of the ratchet member 6, the hooked edge portion of the control member 13 engages the edge portion 14 of the pawl member 11 and holds the pawl member 11 at the far rotated position as shown in FIG. 3, in which all the ratchets 7 are free from engagement with the pawl member 11. Therefore, the head rest is now returned backward by the expansion coil spring 17 until the upper end of the control member 13 abuts against the stop wall portion 16 of the body of the head rest. When the upper end of the control member 13 abuts against the stop wall portion 16, the control member is driven clockwise in the figure so that its hooked edge portion is disengaged from the edge portion 14 of the pawl member 11, which is then rotated anticlockwise in the figure by the expansion coil spring 15, thereby putting its pawl edge into engagement with the most forward ratchet, as shown in FIG. 1. Thereafter, starting from the condition shown in FIG. 1, the head rest may be optionally inclined forward to a certain required inclination. In the course of such a cyclic operation of the head rest between the two extremely opposite positions shown in FIGS. 1 and 3, the head rest is positioned at a desired inclination without requiring any loosening or tightening operation of a screw means.

Although the invention has seen shown and described with respect to a preferred embodiment thereof, it should be understood that various changes and omissions of the form and detail thereof may be made therein by those skilled in the art without departing from the spirit and scope of the invention.

We claim:

1. A device for adjustably fastening first and second relatively rotatable members to each other between first and second relative rotational positions, said device comprising a ratchet member fixed to said first member and having a plurality of ratchets arranged along an arc having its center at the pivoting axis of said first and second members, a pawl member movably supported by said second member and engaging said ratchets so as to allow said first member to rotate relative to said second member in a first direction toward said first relative rotational position but to prevent said first member to rotate relative to said second member in a second direction opposite to said first direction toward said second relative rotational position, a pawl disengaging means which removes said pawl member from engagement with said ratchets when said first and second members have been brought to said first relative rotational position, a control member which engages said pawl member so as to hold said pawl member as disengaged from said ratchets until said first and second members are brought to said second relative rotational position wherein said control member is a hook-like member pivotably supported by said second member having an edge portion, said pawl member has an edge portion adapted to engage said edge portion of said control member when said pawl member has been disengaged from said ratchets by said pawl disengaging means, a spring mounted between said pawl member and said control member, said spring biasing said pawl member so as to resiliently drive said pawl member toward engagement with said ratchets while said spring also biases said control member so as to resiliently drive said edge portion of said control member toward engagement with said edge portion of said pawl member, and a control releasing means which releases said control member from said pawl member when said first and second members have been brought to said second relative rotational position so that said pawl member again engages said ratchets.

2. A device according to claim 1, wherein said pawl disengaging means is a cam land portion formed in said ratchet member adjacent to said plurality of ratchets and adapted to engage said pawl member.

3. A device according to claim 1, wherein said first member has a stop means which engages and drives said control member so as to disengage said edge portion of said control member from said edge portion of said pawl member when said first and second relatively rotatable members have been brought to said second relative rotational position.

4. A device according to claims 1 or 3, further comprising a spring which biases said first and second relatively rotatable members toward said second relative rotational position.

5. A device for adjustably fastening first and second relatively rotatable members to each other between first and second relative rotational positions, said device comprising a ratchet member fixed to said first member and having a plurality of ratchets arranged along an arc having its center at the pivoting axis of said first and second members, a pawl member movably supported by said second member and engaging said ratchets so as to allow said first member to rotate relative to said second member in a first direction toward said first relative rotational position but to prevent said first member to rotate relative to said second member in a second direction opposite to said first direction toward said second relative rotational position, a pawl disengaging means which removes said pawl member from engagement with said ratchets when said first and second members have been brought to said first relative rotational position, a control member which engages said pawl member so as to hold said pawl member as disengaged from said ratchets until said first and second members are brought to said second relative rotational position, wherein said control member is a hook-like member pivotably supported by said second member having an edge portion elastically biased toward said pawl, and said pawl member has an edge portion adapted to be put into engagement with said edge portion of said control member when said pawl member has been driven out of engagement with said ratchets by said pawl disengaging means and a control releasing means which releases said control member from said pawl member when said first and second members have been brought to said second relative rotational position so that said pawl member again engages said ratchets.

6. A device according to claim 5, further comprising a spring which biases said first and second relatively rotatable members toward said second relative rotational position.

* * * * *